April 27, 1948.  S. J. MYERS  2,440,377
MOLDING MACHINE
Filed Aug. 21, 1946    2 Sheets-Sheet 1
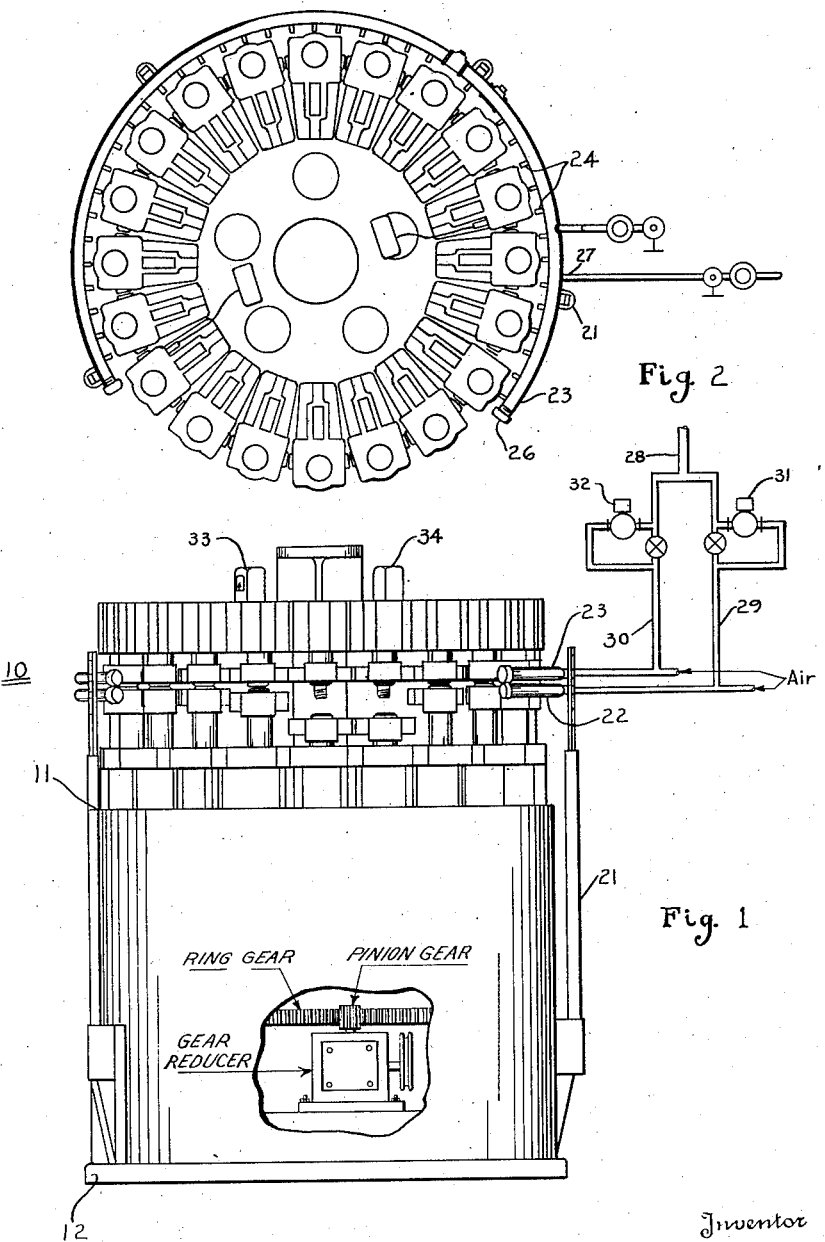
Inventor
Stuart J. Myers
By Richmond A. Hayes
Attorney April 27, 1948.     S. J. MYERS     2,440,377
MOLDING MACHINE
Filed Aug. 21, 1946     2 Sheets-Sheet 2

Inventor
Stuart J. Myers
By Richmond S. Hayes
Attorney

Patented Apr. 27, 1948

2,440,377

UNITED STATES PATENT OFFICE 2,440,377

MOLDING MACHINE

Stuart J. Myers, Warren, Pa., assignor to Warren Plastics Corporation, Warren, Pa., a corporation of Delaware Application August 21, 1946, Serial No. 692,037

4 Claims. (Cl. 18—20)

1

This invention relates to the compression molding of articles from plastic material through the use of an automatic turret type machine. More particularly, the invention pertains to means for heating the molds of such machines during a molding cycle.

In turret type machines for certain continuous sequential molding, each mold is successively filled, closed, heated to a predetermined temperature for a given period, then opened and the molded piece ejected. Each mold, during a molding cycle, is subjected to some form of heat from approximately the time of closing to that of opening. It has been the practice to heat these molds in one of two ways. Some molding machines have included molds individually fitted with electrical heating elements which, through distributing rings, connected them with a source of current supply. Another method of heating the molds has been to enclose or jacket each mold in a manner to provide a compartment into which steam was admitted from a distributor or manifold. Both of these mold heating mechanisms obviously require each mold unit to be manufactured with either an electrical heating element or a compartmented jacket. Inasmuch as each mold is formed from two separable elements, it is evident that the carrying units for each of these elements must each be provided with either of the above mentioned heating mechanisms. A considerable problem is always presented in structures of this nature wherein electrical current or steam from a stationary source must be transmitted to a multiplicity of revolving units. Although these methods of heating the molds have served to produce sufficient heat in each mold to effect desired curing of the plastic material, it is believed the more or less complicated equipment required subjects the machines so equipped to frequent breakdown, with a resulting time loss, repair cost, and waste of, or damage to, the molded articles.

It is a purpose and object of the present invention to provide means for heating the molds of a turret type automatic molding machine.

It is another object of the invention to provide heating means of such nature as to be entirely free and independent of the molds carried by the revolvable turret.

It is a further object of the invention to provide heating means that, being stationary and independent of the revolvable molds, makes possible the use of relatively simple and inexpensive mold carrying units.

It is still another object of the invention to

2 provide mold heating means in the form of a gas burner manifold that conforms to the particular arrangement of the molds, the present disclosure being shown as partially encircling a machine turret and having jets disposed in close proximity with the revolvable molds carried by the turret.

Another and further object of the invention lies in the provision of gas jet heating means in conjunction with gas control valves which are responsive to mold temperature indicating means to the extent that a desired predetermined heat may be maintained in the molds.

Other objects and advantages of the invention will be more fully understood from a consideration of the following specification, taken in conjunction with the accompanying drawings; and in which Fig. 1 is a front elevational view of a turret type molding machine in which is embodied one form of the invention;

Fig. 2 is a top plan view of the structure shown in Fig. 1;

Figure 3:
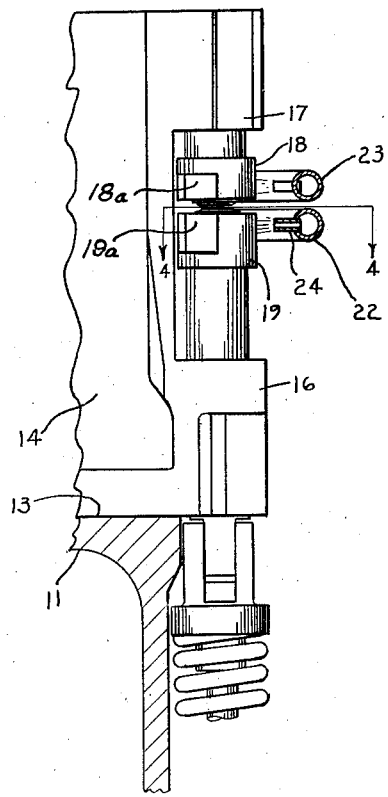
Fig. 3 is a greatly enlarged fragmentary vertical view (partly in section) of the molds, showing the location of the mold heating means.
Figure 4:
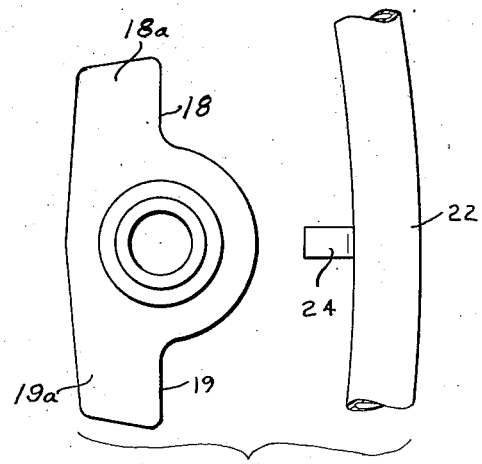
Fig. 4 is an enlarged fragmentary plan view showing the proximity of the heating jets to the molds, being taken substantially as suggested by the line 4—4 of Fig. 3.

Referring more particularly to the drawings, the reference numeral 10 is employed to generally designate a turret type molding machine adapted for continuous sequential operation. The machine illustrated is of the type shown and described in the David Cropp application, Serial No. 604,762, and includes a revolvable turret 11 mounted in any well known manner on a center support carried by a base 12. Of course, suitable mechanism is provided for the purpose of rotating the turret at any desired constant speed. The turret 11 includes an upper portion 13 to which is attached a plurality of radially disposed brackets or mold element supports 14. These supports, in the present disclosure, include portions 16 and 17. The upper element 18 of each mold is secured to support 17, whereas the lower element 19 is mounted for movement through the support 16 into and out of mold closing position. The particular mechanism by which the mold elements are relatively opened and closed forms no part of the present invention and is, therefore, neither shown nor described.

In the present form of the invention the stationary base 12 serves to mount upright supports 21. At their upper ends these supports have brackets suitable for securing a pair of manifolds or tubes 22 and 23. These manifolds are curved to encircle and be uniformly spaced around the turret, substantially as suggested in Fig. 2 of the drawings. One manifold is mounted in spaced, superposed relation to the other manifold, with manifold 23 in the horizontal plane of mold element 18 and manifold 22 in the horizontal plane of mold element 19, when the mold elements are in the position shown in Fig. 3. Each manifold includes a multiplicity of radially, inwardly extending jets 24. As may be seen in the drawing, the ends of these jets are in close proximity with the outermost portions of the molds. Caps 26 serve to close the ends of the manifolds and, at any suitable point intermediate these ends, nipples 27 are provided to facilitate connection of the manifolds with a gas supply line 28. Manifold 22 has connection with line 28 through a pipe 29, whereas manifold 23 is connected with the line 28 through a pipe 30. The connecting pipes 29 and 30 include valves 31 and 32, respectively, which are operable to control flow of gas from the line 28 to manifolds 22 and 23 for the purpose of providing for an increase or decrease of applied heat to either or both sets of mold elements. These valves may have means for manual control but, for the purpose of the invention, are normally operated automatically through thermostatic devices 33 and 34, which are connected respectively with the lower and upper sets of mold elements.

From the foregoing it is evident that heat from the jets of the stationary manifolds is applied to only the frontal surface of each mold element as the turret revolves. With a conventional type of mold element, such application of heat would be insufficient to effect complete curing of the articles being molded. In practice, that portion of each article remote from the heat would be under cured, and the balance of the article, fully cured. To assure uniform curing of articles molded in a machine of this type, it is proposed to provide each of the mold elements 18 and 19 with wings or extensions 18a and 19a, respectively. As may be seen in the drawing, these wings are the full thickness or height of the element of which they form an integral part. They extend laterally from opposite sides to an extent to greatly increase the frontal area of the elements. The wings, being subjected to heat emanating from the manifold jets, serve to conduct sufficient heat to the rear of each element to effect uniform and complete curing.

To operate a turret type molding machine embodying the heating means of the invention, the thermostats for the upper and lower sets of mold elements may be adjusted or set to the temperature at which a given plastic will cure during a cycle of operation of the machine. The jets may then be lighted and the turret started revolving. At such time as the temperature indicating means shows the elements of the molds to be heated to the desired temperature, plastic material may be sequentially fed to the molds through whatever mechanism may be provided on the machine for this purpose. The flame emanating from each jet is of such force as to cause it to virtually brush the entire frontal surface and both wings of each of the mold elements with which it is aligned. Thus, as the turret of the machine makes one complete revolution, the mold elements are subjected to the heating effect of successive jets. During a period of use it is evident that the molds may tend to heat up to a higher temperature than desired for a given curing. At such time the thermostatic device operates to reduce the flame of gas to either or both of the manifolds 22 and 23, and the lesser flame from the jets will continue until the temperature of the molds has been lowered to an extent to again call for full heat.

From the foregoing it is evident that through use of the present invention, the mold element may be of extremely simple construction and that no means other than that for indicating the temperature of the molds need be attached thereto. Furthermore, it is possible to adapt the structure of the invention to the curing of a large variety of plastics in an automatic turret type machine.

Although applicant has shown and described only one form of his invention, it will be apparent to those skilled in the art that modification thereof, to the extent of altering the burner structure and adapting it to other turret type machines, is contemplated insofar as it is within the spirit and scope of the invention as set out in the annexed claims.

Having thus set forth my invention, what I claim as new and for which I desire protection by Letters Patent is:

1. In a molding machine having a rotatable turret of generally circular cross section, means for rotating said turret, a plurality of molds carried by and radially disposed in a common plane about said turret, said molds including upper and lower separable elements, said elements each having a frontal portion that includes lateral extensions, structure for heating said molds comprising two stationary gas heating units arranged in an arc around the molds on said turret and including burners so positioned as to direct a flame successively onto the full frontal surface of each element and its lateral extensions as said turret revolves.

2. In a molding machine having a rotatable turret, means for rotating said turret, a plurality of molds carried by and disposed in a common plane about said turret, said molds including upper and lower separable elements, each of said elements having a heat absorbing frontal portion consisting of a central mold area integral with opposed extensions, structure for heating the elements of said molds comprising two stationary gas heating units arranged in an arc about said turret and including a multiplicity of jets disposed in close proximity with the frontal portions of said elements, said jets being so positioned as to direct a flame successively onto said frontal portions as said turret revolves, whereby to effect full curing of the material contained in each of said molds.

3. In a molding machine having a circular rotatable turret, means for rotating said turret, a plurality of molds carried by and radially disposed in a common plane about said turret, said molds including upper and lower separable elements, each of said elements comprising a central mold area and extensions projecting from opposite sides of said mold area, and structure for heating said molds consisting of two gas heating units arranged in an arc of the same center as that of said turret and so positioned as to direct a flame successively onto one extension, the central mold area, and the other extension, of each of said molds.

4. In a molding machine having a circular rotatable turret, means for rotating said turret, a plurality of molds carried by and radially disposed in a common horizontal plane around said turret, each of said molds comprising upper and lower separable elements, each element having a central mold area and a heat absorbing portion partly surrounding said area, wing-like heat absorbing extensions projecting from opposite sides of said element integral with said heat absorbing portion, and structure for heating the elements of said molds consisting of a gas heating device having a plurality of burners so positioned as to direct a flame successively onto one extension, the central mold area, and the other extension, of each of said molds.

STUART J. MYERS.

REFERENCES CITED

The following references are of record in the file of this patent:

UNITED STATES PATENTS

| Number | Name | Date |
|---|---|---|
| 1,356,870 | Maeda | Oct. 26, 1920 |
| 2,058,880 | Hunt | Oct. 27, 1936 |